Aug. 23, 1932.  J. G. GIBSON  1,873,380
POWER MECHANISM FOR WELLS
Filed May 17, 1930  2 Sheets-Sheet 1

INVENTOR.
Jesse G. Gibson
BY
ATTORNEYS.

Aug. 23, 1932.   J. G. GIBSON   1,873,380
POWER MECHANISM FOR WELLS
Filed May 17, 1930   2 Sheets-Sheet 2

Jesse G. Gibson
INVENTOR.

BY
ATTORNEYS.

Patented Aug. 23, 1932

1,873,380

UNITED STATES PATENT OFFICE

JESSE G. GIBSON, OF BRADFORD, PENNSYLVANIA

POWER MECHANISM FOR WELLS

Application filed May 17, 1930. Serial No. 453,247.

Powers for wells, such as oil wells, are subjected to very severe strains. In order to operate them from convenient sources of power, such as electric motors and internal combustion engines having high speeds, it is necessary to supply gearing by means of which the cranks of the power may be reduced to a pumping speed. Various expedients have been utilized for this purpose, but either they are very bulky, or develop weaknesses under the severe loads and shocks to which the power is subjected. The present invention is designed to simplify such a mechanism providing it with a reduction gearing which may be included in a comparatively small space and formed of such rugged proportions as to easily sustain the shocks to which the apparatus is subjected and further to utilize a gearing that can be readily fabricated. The invention also contemplates a superior means for lubrication of the apparatus. This is important in that these devices are placed at intervals through the field and while performing a very severe duty are not in position to be very carefully serviced. Features and details of the invention will appear from the specification and claims.

A preferred embodiment of the invention is illustrated in the accompanying drawings as follows:—

Figures 1, 2:
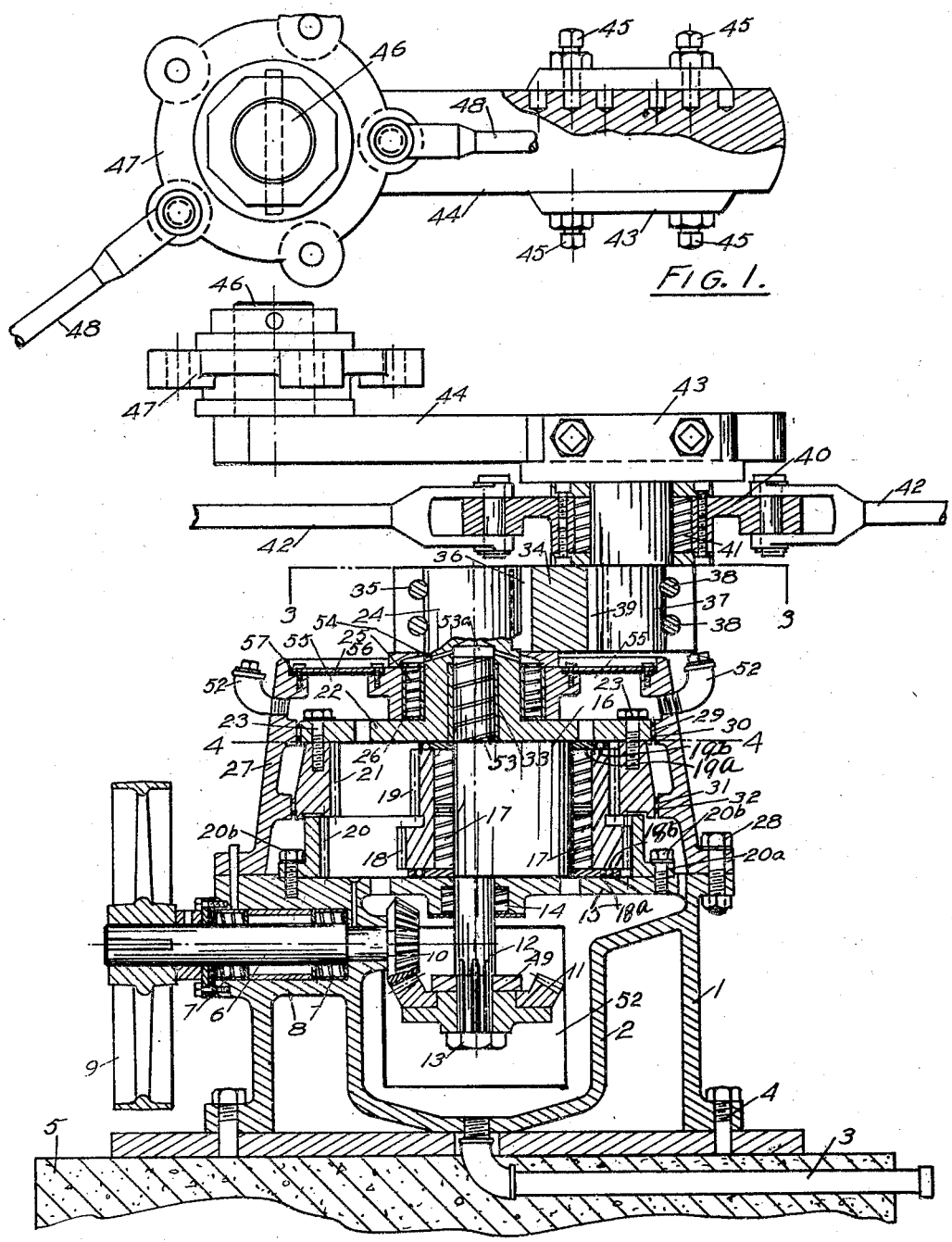

Fig. 1 shows a plan view of the upper crank.

Fig. 2 a central vertical section through the apparatus.

Figure 3:
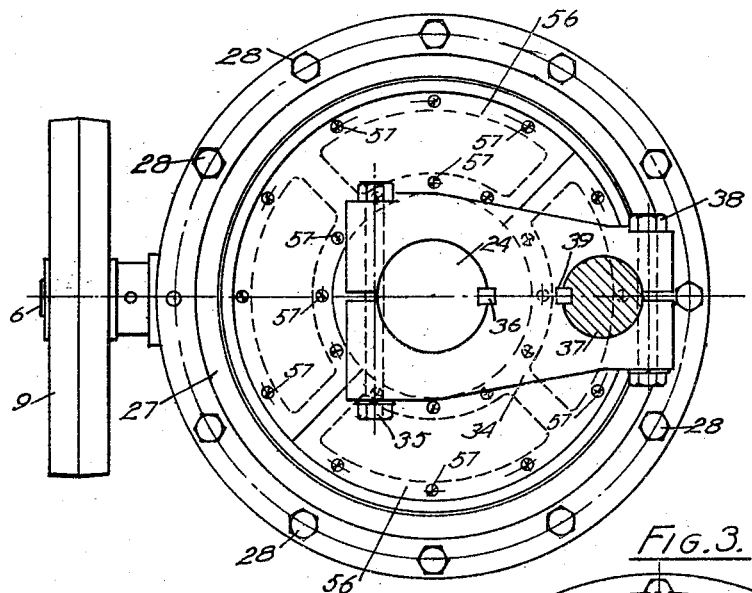

Fig. 3 a section on the line 3—3 in Fig. 2.

Figure 4:
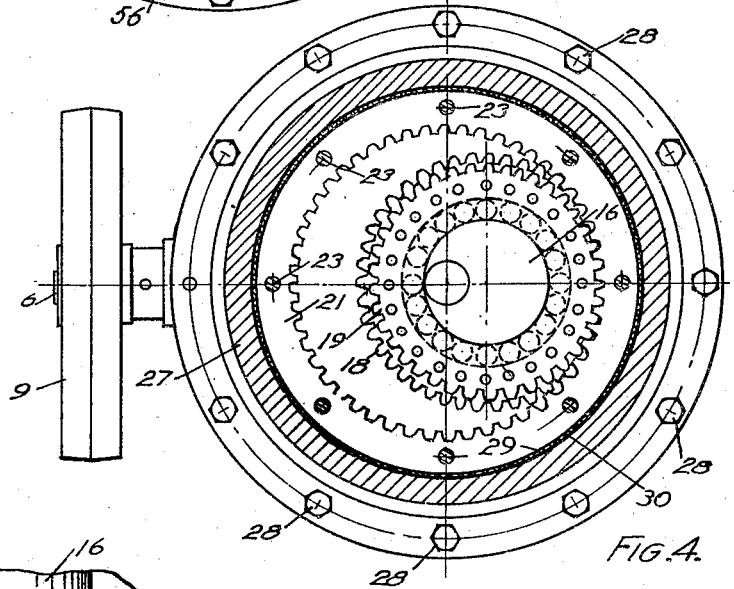

Fig. 4 a section on the line 4—4 in Fig. 2.

Figure 5:
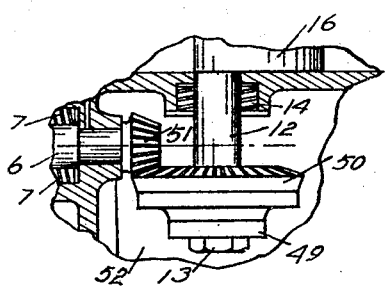

Fig. 5 a detached view showing a substitute gearing reducing the speed.

A base frame 1 is provided with the oil sump walls 2. A drain pipe 3 is provided for this sump. The base frame is secured by bolts 4 to a foundation 5.

A horizontal driving shaft 6 is carried in roller bearings 7 in a journal extension 8 of the base section of the frame. A drive pulley 9 is provided for the drive shaft and this is driven from any convenient source of power (not shown). A beveled gear 10 is fixed on the inner end of the shaft 6 and meshes with a beveled gear 11. The beveled gear 11 is fixed on a vertical shaft 12 and removably secured thereon by a bolt, or stud 13 extending into the end of the shaft.

The vertical shaft is journaled in a roller bearing 14 arranged in a top plate 15 of the base section of the frame. An eccentric 16 is fixed, or formed integrally with the shaft 12 and arranged immediately above the plate 15. A roller bearing 17 is arranged around the eccentric 16 on which gears 18 and 19 are mounted. The gears 18 and 19 are rigidly connected and preferably of integral construction. They are given an orbital movement as the eccentric is rotated with the shaft 12. They are of slightly different diameter at their pitch line, the gear 18 being of slightly greater diameter than the gear 19. The gear 18 meshes with a fixed internal gear 20. The fixed gear has a flange 20a and is rigidly secured by bolts 20b with the plate 15 of the base section of the frame. A driven internal gear 21 meshes with the gear 19. It is secured to and fixed with a plate 22 by means of screws 23. The plate 22 forms a connection with a driven shaft 24. This driven shaft is journaled by rollers 25 in a roller bearing 26. The bearing 26 is carried by an upper frame section 27 which is annular and oil-tight and connected with the lower frame section by bolts 28. The upper frame section and lower frame section when connected form an oil-tight receptacle for a lubricant. The plate 22 has a bearing edge 29 which operates in a bearing 30 in the frame section 27 and the gear 21 has a bearing edge 31 which operates on a bearing surface 32 in the frame section 27. Thus the driven gear and the driven shaft have roller bearings including the rollers 25 and the bearings 30 and 31 giving it stability and ample bearing surface. The shaft 24 has a bearing 33, at its upper end for the upper end of the shaft 12. A crank 34 is fixed on the upper end of the shaft 24, being clamped thereon by bolts 35 and locked with a key 36. A crank pin 37 is secured with the crank by means of bolts 38 and locked with a key 39. A crank disc 40 is journaled on the crank pin 37 by means of a roller bearing 41 and pull rods 42 radiate from the crank disc 40 in the usual manner. A crank support 43 is fixed on the upper end of the pin 37 and a crank 44 is adjustably secured in the plate 43 by screws 45. A crank pin 46 is arranged on the crank 44 and a crank disc 47 is journaled on the pin 46. Pull rods 48 radiate from the crank disc 47 in the usual manner.

In the operation of the device, power is delivered to the pulley 9 and communicated through the shafts and gearing to the vertical shaft 12. A slight reduction is made between the gear 10 and 11. The gears 18 and 19 form with the gears 20 and 21 what is known as an epicyclic gear which gives in a rugged and convenient manner a very great reduction in a very small space and in a space that can be readily lubricated. Thus with a speed of 1200 revolutions at the pulley 9 and a reduction of approximately one to two in the gears 10 and 11 the crank speed of the power may be readily reduced by the slight variation in the epicyclic gear to a speed of 18 revolutions per minute, thus avoiding the use of very large gears that are sometimes used, or worm gears which give some trouble in these connections and provide gears that can be readily fabricated and lubricated. The bearings of the cranks which are subjected to the severe shocks from the pull rods are also amply supported and the whole device occupies but a comparatively small space.

It is desirable usually to change the speed of pumping under certain conditions and this can be readily taken care of in the present apparatus by removing the gear 11 and substituting a gear 50 (see Fig. 5), with a similar pinion 51 on the shaft 6. This may be conveniently accomplished through a removable plate 52 which is arranged at the side of the frame 1, for this purpose. In order to change the pitch line of the gear 50 from that of the gear 11 a spacer plate 49 is provided which makes a simple means of adjusting the position of the gear 50 to the similar gear, or pinion 51.

In lubricating the apparatus the lubricant is poured in through a connection 52 there being a plurality of these connections in as much as in some positions these powers are arranged on slopes which tilt the powers as a whole somewhat and it is desirable to fill the entire case formed by the frame with lubricant. Thus with the plurality of openings the higher one may be utilized for filling. The shaft 12 has spirals 53 at its upper end and these carry oil into a cavity 53a from which it passes by the passage 54 to lubricate the bearing 26.

A series of openings 55 extend around the upper part of the case formed by the frame 27. These are covered by semicircular plates 56 which are secured on the frame by bolts 57. By removing these plates a large opening is provided through which a cleansing fluid, such as gasoline may be passed through the case out through the drainage pipe 3 for cleaning the bearings and gears.

I prefer to support the gears 18 and 19 axially by a ball bearing. This can be readily accomplished by means of plates 18a and 19a at the ends of the gears 18 and 19 respectively, these plates being perforated at intervals and containing balls 18b and 19b respectively. The gears have an orbital movement around the center of the shaft 12 and have a rotary movement around the eccentric 16. The balls, therefore, follow different paths and cover a wearing surface on the plate 15 and the plate 22 of considerable extent. This assures quite a long period of wear and also assures a smooth, easy running of the gears under any axial thrust that may be placed upon them.

What I claim as new is:—

1. In a power for wells, the combination of a frame comprising a case and base; a vertically extended shaft journaled in the frame; a pull rod crank above the case; an epicyclic gear between the crank and shaft comprising two orbitally moving and rigidly connected gears mounted off-center on said shaft and having different pitch diameters; a stationary gear meshing with one of the orbitally moving gears; a driven gear meshing with the other orbitally moving gear a bearing in the case for the driven gear; a connection between the driven gear and the crank the bearing receiving the thrust of the crank; a pull rod connection on the crank; and a bearing for the vertical shaft in said connection, said shaft terminating below the top of the connection.

2. In a power for oil wells, the combination of a frame in the form of an oil tight case; a vertically extended shaft journaled in the frame; a pull rod crank; an epicyclic gear between the crank and shaft comprising two orbitally moving and rigidly connected gears mounted off-center on said shaft and having different pitch diameters; a stationary gear meshing with one of the orbitally moving gears; a driven gear meshing with the other orbitally moving gear; a connection between the driven gear and the crank; and a pull rod connection on the crank said frame through the case sustaining the entire pull thrust and, said case enclosing said gears and being provided with means for the introduction of lubricant at the top of the case and the drainage of a lubricant from the bottom of the case.

3. In a power for oil wells, the combination of a frame in the form of an oil tight case; a vertically extended shaft journaled in the frame; a pull rod crank above the case; an epicyclic gear between the crank and shaft comprising two orbitally moving and rigidly connected gears mounted off-center on said shaft and having different pitch diameters; a stationary gear meshing with one of the orbitally moving gears; a driven gear meshing with the other orbitally moving gear; a connection between the driven gear and the crank a bearing for the driven gear, said bearing receiving the thrust of the crank; a horizontal drive shaft at the bottom of the case; beveled gears connecting the horizontal shaft with the vertical shaft; a pull rod connection on the crank, said case enclosing the gear mechanism and bearings and being adapted to retain a lubricant for supplying the gears and bearings; and a removable plate on the frame opposite the removable gears through which said gears may be removed.

4. In a power for wells, the combination of a frame; a vertically extended shaft journaled in the frame; a pull rod crank; an epicyclic gear between the crank and shaft comprising two orbitally moving and rigidly connected gears mounted off-center on said shaft and having different pitch diameters; a stationary gear meshing with one of the orbitally moving gears; a driven gear meshing with the other orbitally moving gear; a connection between the driven gear and the crank; a pull rod connection on the crank; and ball bearings comprising plane ball seats and ball retainers at the ends of the orbitally moving gears guiding said balls in orbital movements on said plane ball seats and varying the path of travel on said plane ball seats with each revolution.

5. The combination in an epicyclic gear structure of two orbitally moving and rigidly connected gears mounted off center and having different pitch diameters; a stationary gear meshing with one of the orbitally moving gears; a driven gear meshing with the other orbitally moving gear; and ball bearings comprising plane ball seats and ball retainers at the ends of the orbitally moving gears guiding said balls in orbital movements on said plane ball seats and varying the path on said plane ball seats with each revolution.

In testimony whereof I have hereunto set my hand.

JESSE G. GIBSON.